(12) United States Patent
Tang et al.

(10) Patent No.: US 7,805,759 B2
(45) Date of Patent: Sep. 28, 2010

(54) SYSTEMS AND METHODS FOR MALWARE-CONTAMINATED TRAFFIC MANAGEMENT

(75) Inventors: Zhenghua Tang, Shanghai (CN); Zongquan Tang, Shanghai (CN); Chuanzhen Guo, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 883 days.

(21) Appl. No.: 11/680,608

(22) Filed: Feb. 28, 2007

(65) Prior Publication Data

US 2008/0189786 A1 Aug. 7, 2008

Related U.S. Application Data

(63) Continuation of application No. PCT/CN2007/000395, filed on Feb. 6, 2007.

(51) Int. Cl.
  *G06F 21/20* (2006.01)
  *G06F 11/30* (2006.01)
  *G06F 15/16* (2006.01)
(52) U.S. Cl. .................. 726/22; 709/224; 709/233; 709/235
(58) Field of Classification Search .................. None
  See application file for complete search history.

(56) References Cited

U.S. PATENT DOCUMENTS 6,725,040 B2 * 4/2004 Jiang .................. 455/436
6,789,190 B1 * 9/2004 Cohen .................. 713/160
6,968,461 B1 11/2005 Lucas et al.
7,047,303 B2 * 5/2006 Lingafelt et al. .......... 709/229
7,302,705 B1 * 11/2007 Boivie .................. 726/22
7,389,537 B1 * 6/2008 Callon et al. .............. 726/22
7,436,770 B2 * 10/2008 Sterne et al. .............. 370/235
7,523,497 B2 * 4/2009 Cohen .................. 726/22
7,719,976 B2 * 5/2010 Christenson et al. ........ 370/230
2004/0128539 A1 * 7/2004 Shureih .................. 713/201
2005/0152375 A1 7/2005 An et al.
2007/0157306 A1 * 7/2007 Elrod et al. .............. 726/14
2007/0169195 A1 * 7/2007 Anand et al. ............. 726/23
2008/0291934 A1 * 11/2008 Christenson et al. ....... 370/412

FOREIGN PATENT DOCUMENTS

EP 1722535 A2 11/2006

OTHER PUBLICATIONS

Foreign communication from a related counterpart application—International Search Report and Written Opinion, PCT/CN2007/000395, Nov. 8, 2007, 6 pages.

* cited by examiner

*Primary Examiner*—Christopher A Revak
(74) *Attorney, Agent, or Firm*—Conley Rose, P.C.; Grant Rodolph (57) ABSTRACT

The fraction of virus-infected information, in wireless uplink flows is monitored, and the different fractions are used to adjust bandwidth assignments for different channels. Channels which contain a high fraction of malware contamination are thereby prevented from imposing an excess burden on total available bandwidth.

23 Claims, 13 Drawing Sheets

*Figure 6A.* UMTS Architecture (Prior Art)

*Figure 6B.* UTRAN Radio Interface Architecture (Prior Art)

SYSTEMS AND METHODS FOR MALWARE-CONTAMINATED TRAFFIC MANAGEMENT

CROSS REFERENCE TO RELATED APPLICATIONS

This application is a continuation of international application PCT/CN07/00395 filed Feb. 6, 2007 and entitled "Systems and Methods for Malware-Contaminated Traffic Management."

BACKGROUND AND SUMMARY OF THE INVENTIONS

1. Field of the Invention

The present application relates to management: of a multi-access environment, and more particularly to bandwidth management for virus infected user equipment uplink flows in a multi-access network under bandwidth constraints.

2. Description of Related Art

Computer viruses are executable files or attachments often hidden or disguised as legitimate files or messages. More precisely, computer viruses include any form of self-replicating computer code which can be stored, disseminated, and directly or indirectly executed by unsuspecting hosts. Viruses can travel between machines over network connections or via infected media and cause malicious and sometimes destructive results. Viruses can be executable program or macro code disguised as application programs, functions, macros, electronic mail attachments, and even applets and hypertext links.

The earliest computer viruses infected boot sectors and files. Over time, computer viruses evolved into numerous types, including cavity, cluster, companion, direct action, encrypting, multipartite, mutating, polymorphic, overwriting, self-garbling, and stealth viruses. Recently, macro viruses have become popular. These viruses are written as scripts in macro programming languages and are attached to documents and electronic mail attachments. Other virus types have been developed for other hardware types, e.g. for cell phones. (Any complex programmable system, which can send and receive files is a prospect for virus infection.)

Historically, anti-virus solutions have reflected the sophistication of the viruses being combated. The first anti-virus solutions were stand-alone programs for identifying and disabling viruses. Eventually, anti-virus solutions grew to include special purpose functions and parameterized variables that could be stored in data files read by the anti-virus engine. Over time, the special purpose functions evolved into specialized anti-virus languages for defining virus scanning and cleaning, including removal and disablement, instructions.

Wireless communications present further challenges. Typically, radio bandwidth is a multi-access resource shared among multiple users. A recent study of THETA company's VirusGuardMUX monitoring of multi GPRS networks shows that virus contamination infected about 30% of data flow. This not only wastes precious GPRS bandwidth, but also can lead to customer dissatisfaction at higher charges (in a system where charges are traffic based).

Current firewall techniques and secured exchange technology provide solutions in virus detection and filtering. Most important among those techniques are filtering methods, Access Control List (ACL), and network address re-mapping, etc, In IPv6 the IPSec protocol also became mandatory, adding features to enforce network security. (IPSec protocol also works in IPv4, but is optional.) Because IPSec introduces authentication and encryption mechanism to implement identification authentication at the network layer, it guarantees the integrity and privacy and hence the security in the network layer.

The virus types found in wireless devices are mainly layer seven application virus types (and also layer three worm virus). They are normally carried over GTP-U protocol. The traditional firewall technology basically filters out virus on the downlink flow. However, it does not control the virus flows on the uplink. Consequently, a great percentage of precious uplink bandwidth was wasted on the transmission of virus infected flows on the uplink before they can be detected.

Viruses are not the only type of malicious software, or "malware." As internet usage has evolved, a variety of malware types has appeared, not all of which may be viruses in the narrowest sense. However, many different types can cause a useless burden on bandwidth. For example, viruses will send out many copies of themselves, but other kinds of malware may send spam (unsolicited advertising) to multiple recipients, or may recruit host computers to participate in a DDOS (Distributed Denial Of Services) attack.

SUMMARY OF THE INVENTION

The present application discloses new ways to manage bandwidth for information flows. In various embodiments the bandwidth allocations are adjusted, in a multi-access environment, in accordance with the observed density of virus-contaminated portions of the data flow. This is particularly advantageous in managing uplink traffic in a wireless network.

In various alternative embodiments, a bandwidth allocation can be increased again, after it has been decreased, if an intensity test is met which is more stringent than an intensity test which leads to bandwidth reduction.

In various alternative embodiments, a bandwidth allocation can be increased again, after it has been decreased, if an intensity test is met after a set time delay.

The disclosed innovations, in various embodiments, provide one or more of at least the following advantages:

Implementation can be completely decentralized, leading to a system scalable to large numbers of users.

Making use of the current existing virus detection mechanism. The disclosed innovations can be integrated seamlessly into the existing virus detection mechanism.

Working independently of other network entities. Since no interaction with other network entities is required, signaling overhead is minimized.

Increasing the bandwidth utilization efficiency. By reducing the bandwidth allocated to infected traffic flow, the bandwidth, available to other multi access users is increased, Better management of virus bandwidth consumed by bad uplink transmissions.

Re-programming of system parameters is allowed. Manufactures or service providers have the flexibility to decide a threshold where actions are required, and/or to adjust the relationship of intensity detected to the bandwidth reduced or increased.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 1:
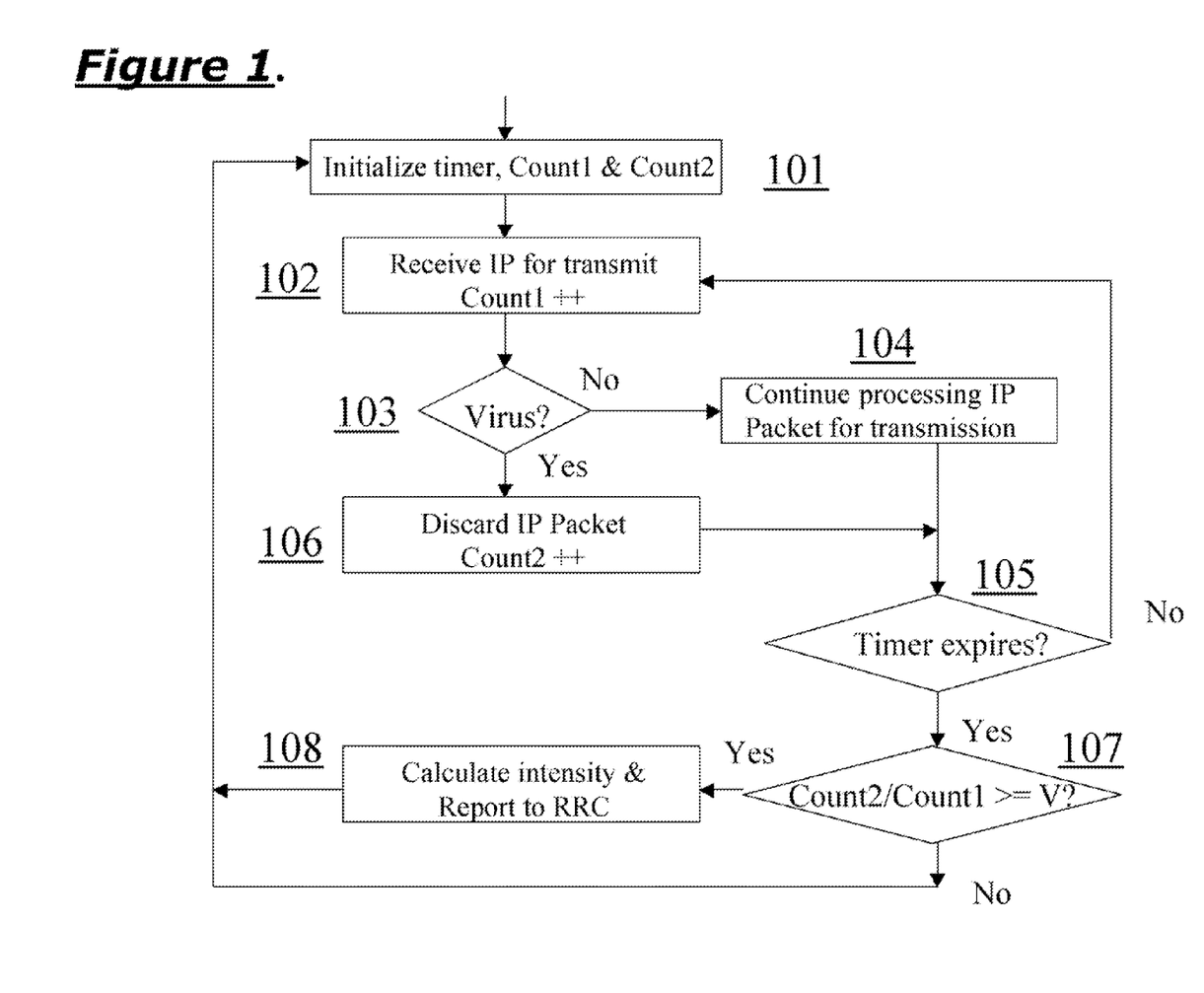
FIG. 1 conceptually illustrates a sample class of embodiments.

FIG. 1 illustrates the main concept of a sample embodiment that can be implemented in PDCP. This is only an example and one skilled in the art can design various modifications and variations based on the main concept. In this embodiment the process starts with the initialization of a timer and two counters: Count1 and Count2 101. Count1 is used to count the total number of IP packets received during a pre-set period of time indicated by a tinier. Count2 counts the total number of virus infected IP packets out of the total IP packets during the same time period. Whenever an IP packet is received by PDCP for transmission, Count1 is incremented by 1 102, Then an existing virus detection mechanism is invoked to see if this IP packet is infected 103. If the IP packet is not infected, then PDCP continues its normal process to handle this IP packet for transmission 104. Then the timer is checked to see if it is expired 105. If the timer has not: expired, then it goes back to process next IP packet for transmission 102. Otherwise, it goes to check a threshold V 107. However, if the IP packet is infected (that is virus is detected) in step 103, the IP packet will be discarded and Count2 is incremented by 1 (step 106).

Then the ratio of Count2/Count1 is calculated as intensity and is checked against the threshold V 107. If the threshold is not crossed, then the process repeats by going back to initialization 101. Otherwise, infection intensity is calculated and RRC is notified of the threshold crossing 108 before the process repeats.

There are various ways to quantify the intensity. One of them can be:

intensity=Count2/Count1.

The main purpose of threshold is to decide under what virus infection intensity condition an action is required.

Figure 2:
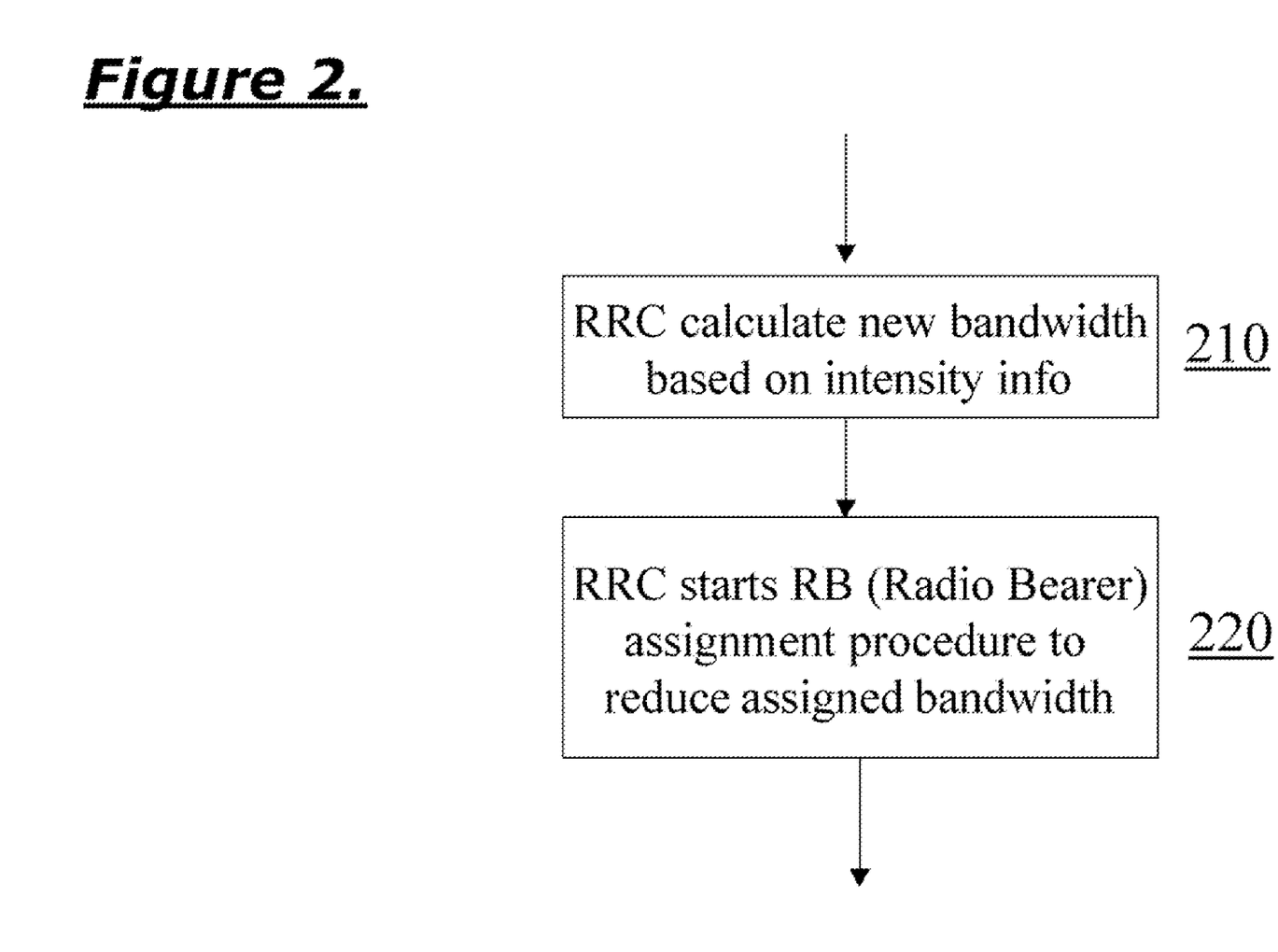
FIG. 2 shows steps taken, in a sample embodiment, when a threshold crossing is reported.

FIG. 2 illustrates the sample embodiment implemented in RRC to handle the adjustment of allocated bandwidth after threshold crossing is reported as demonstrated in step 108 of FIG. 1. Again, this is only an example to illustrate major concept, one skilled in the art can design various modifications and variations based on the main concept. First, RRC calculates the new bandwidth allocation based on the intensity information 210. There are various ways to calculate the new bandwidth. One example would be:

New_Bandwidth=Existing_Bandwidth*(1−Count2/Count1)

It then starts the RB (Radio Bearer) bandwidth assignment procedure to request the assignment of the new bandwidth 220. The details of this procedure are specified in RRC specifications and are outside the scope of this document.

Figure 3:
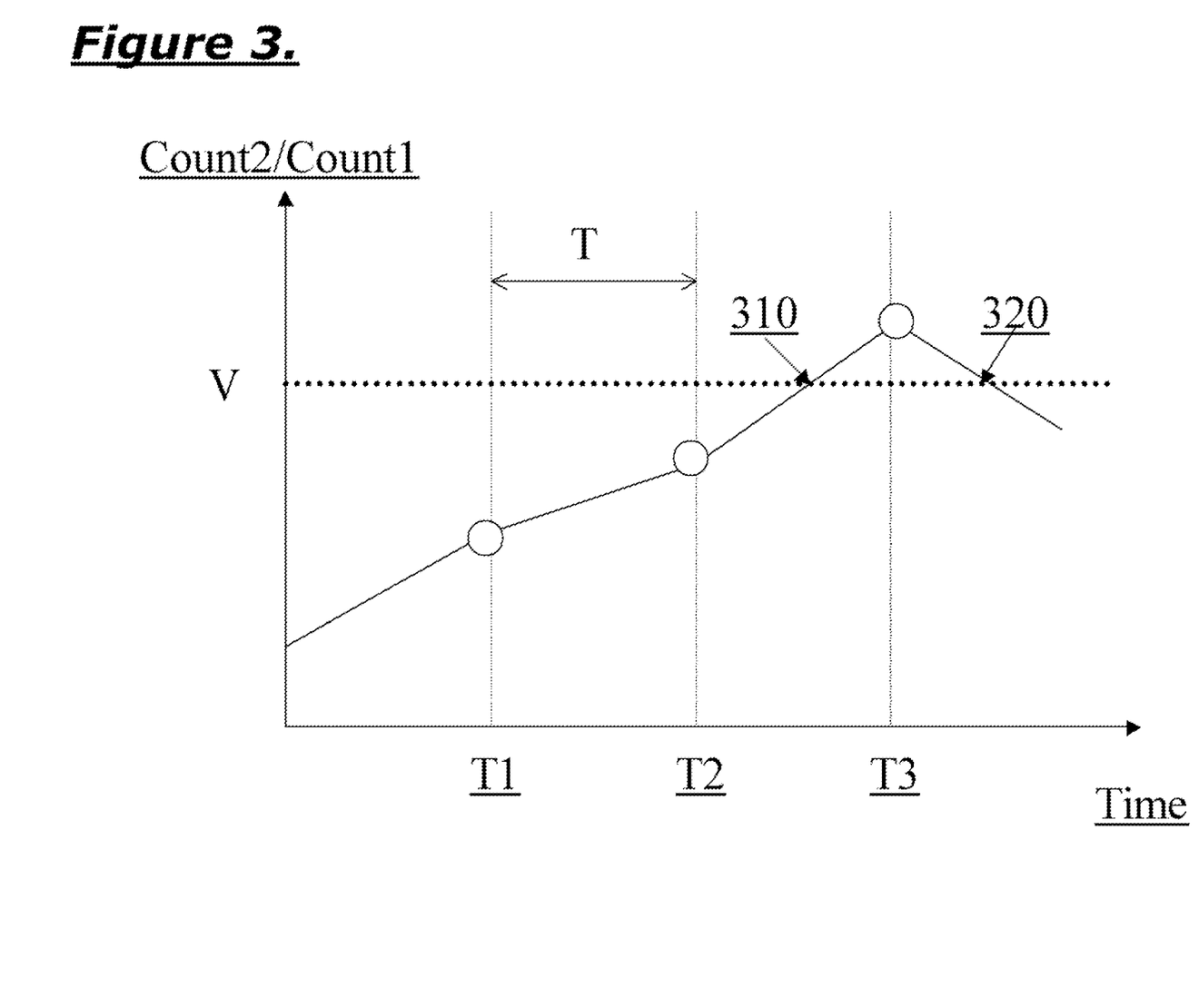
FIG. 3 illustrates an example of threshold crossing calculations.

FIG. 3 illustrates the threshold crossing concepts. When Count2/Count1 >=V (threshold crossed from below) 310, a virus infection intensity is detected to warrant an action and the bandwidth shall be reduced. When Count2, Count1<V (threshold crossed from above) 320, the virus flow intensity is considered as faded enough to warrant an action and the bandwidth shall be recovered.

Figure 4:
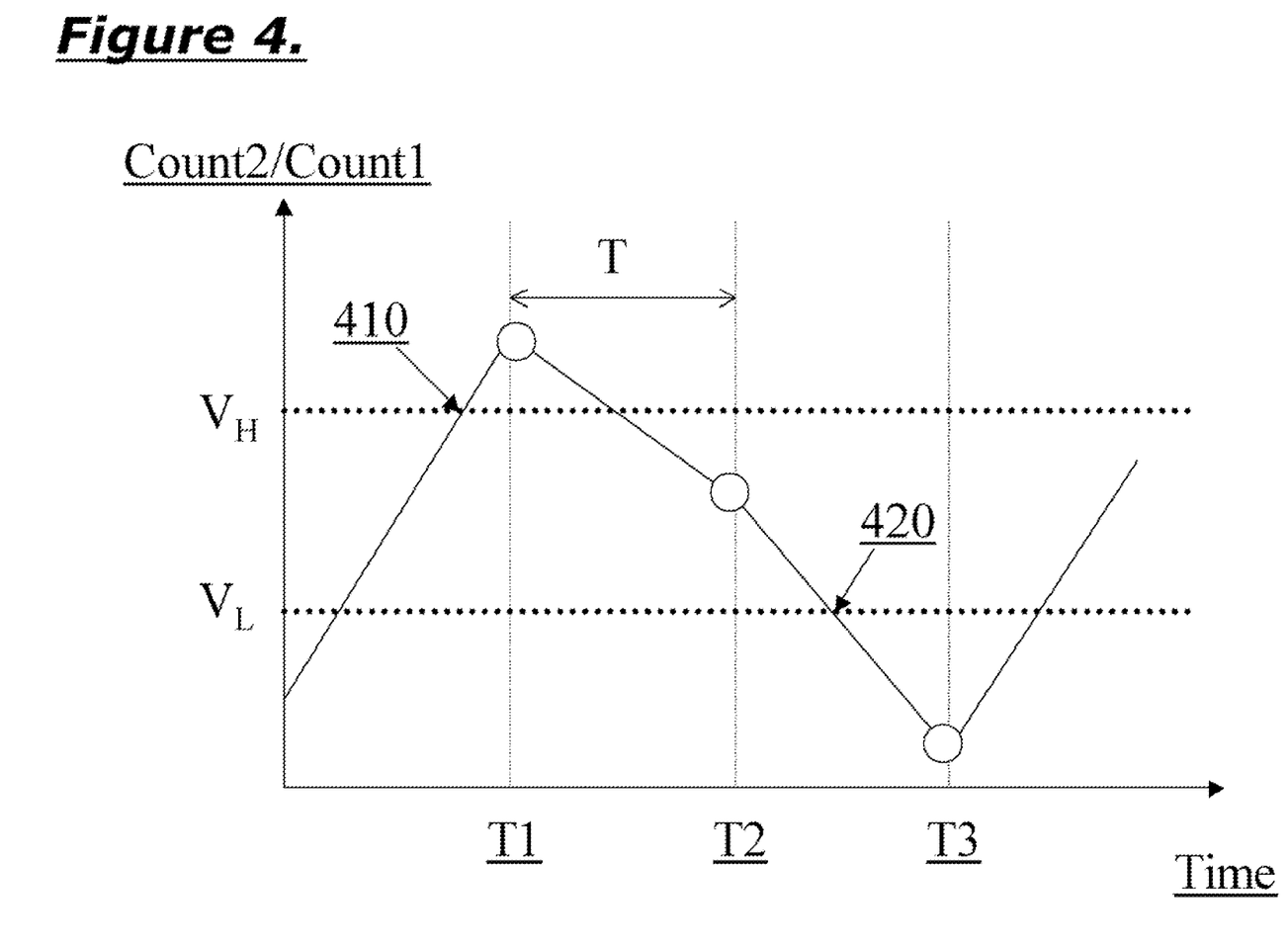
FIG. 4 illustrates another example of threshold crossing calculations, where different threshold values are used depending on the direction of transition.

FIG. 4 illustrates a different way to calculate threshold crossings. In this example, a lower watermark threshold $V_L$ and a higher watermark threshold $V_H$ values can be pre-determined to automatically adjust bandwidth up or down. For instance, each time when threshold $V_H$ is crossed from below for the first time, bandwidth is decreased and each time when threshold $V_L$ is crossed from above for the first time, bandwidth is increased. When Count2/Count1>=VH for the first time (threshold crossed from below) 410, a virus flow is detected and the bandwidth shall be reduced. When Count2/Count1<=VL for the first time (threshold crossed from above) 420, the virus flow is faded and the bandwidth shall be recovered.

Figure 5:
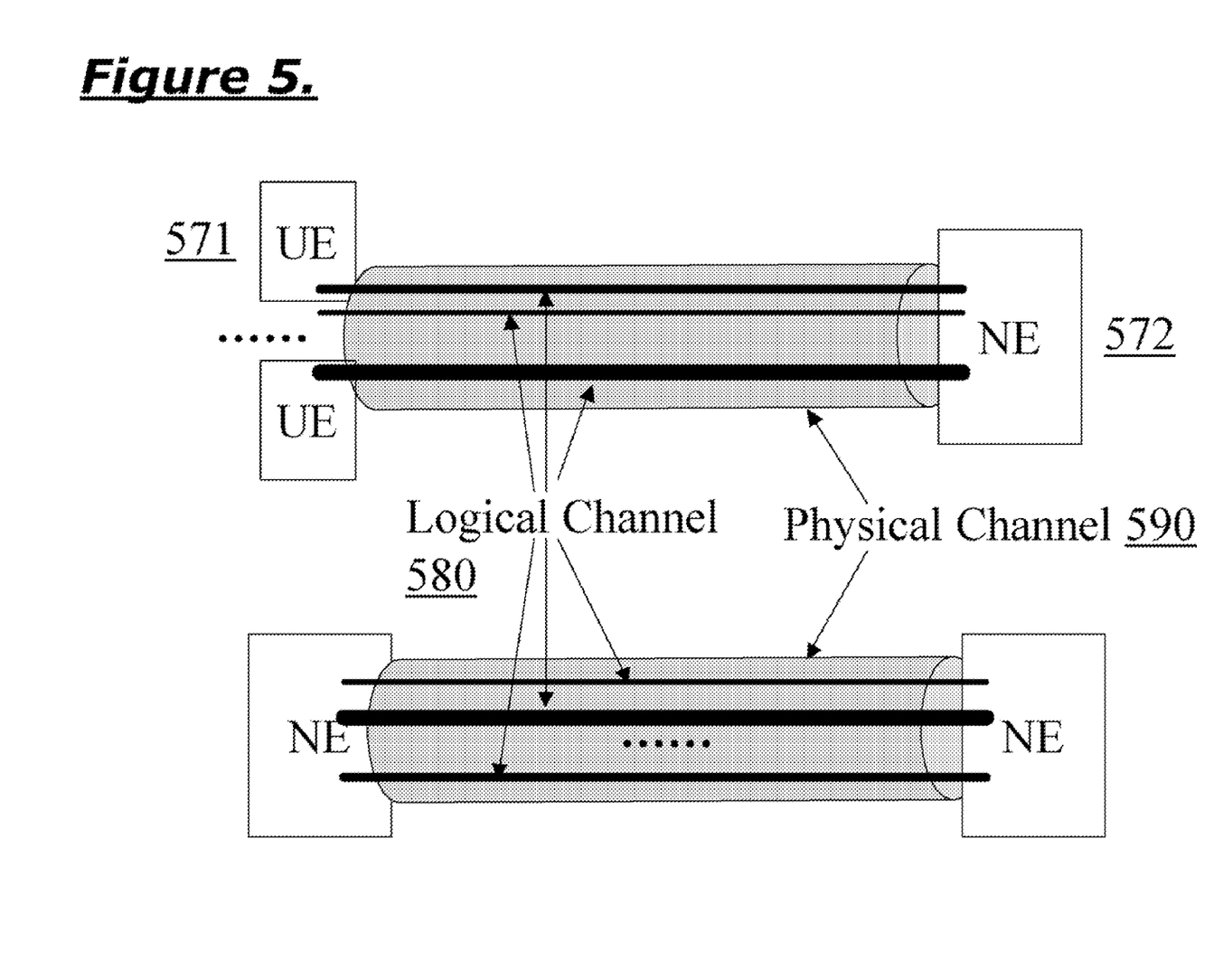
FIG. 5 shows two examples of networking environments which are advantageously modified according to various disclosed embodiments.

FIG. 5 shows examples of networking environments incorporating the disclosed inventions. UE 571 is user equipment that can be a wireless device, a CPE (Customer Premise Equipment) such as DSL or cable modem, or a computing device with networking capability. ME 572 is network entity that can be a router, a switch, a multiplexer/demultiplexer, etc. Physical channel 590 can be frequency channel, time-slot channel or code based channel (such as CDMA) in radio, electrical, or optical domain. It can be multi-accessed by dividing into multiple logical channels 580 (or called sub-channels) with bandwidth of each logical channel individually adjustable.

Figure 6A:
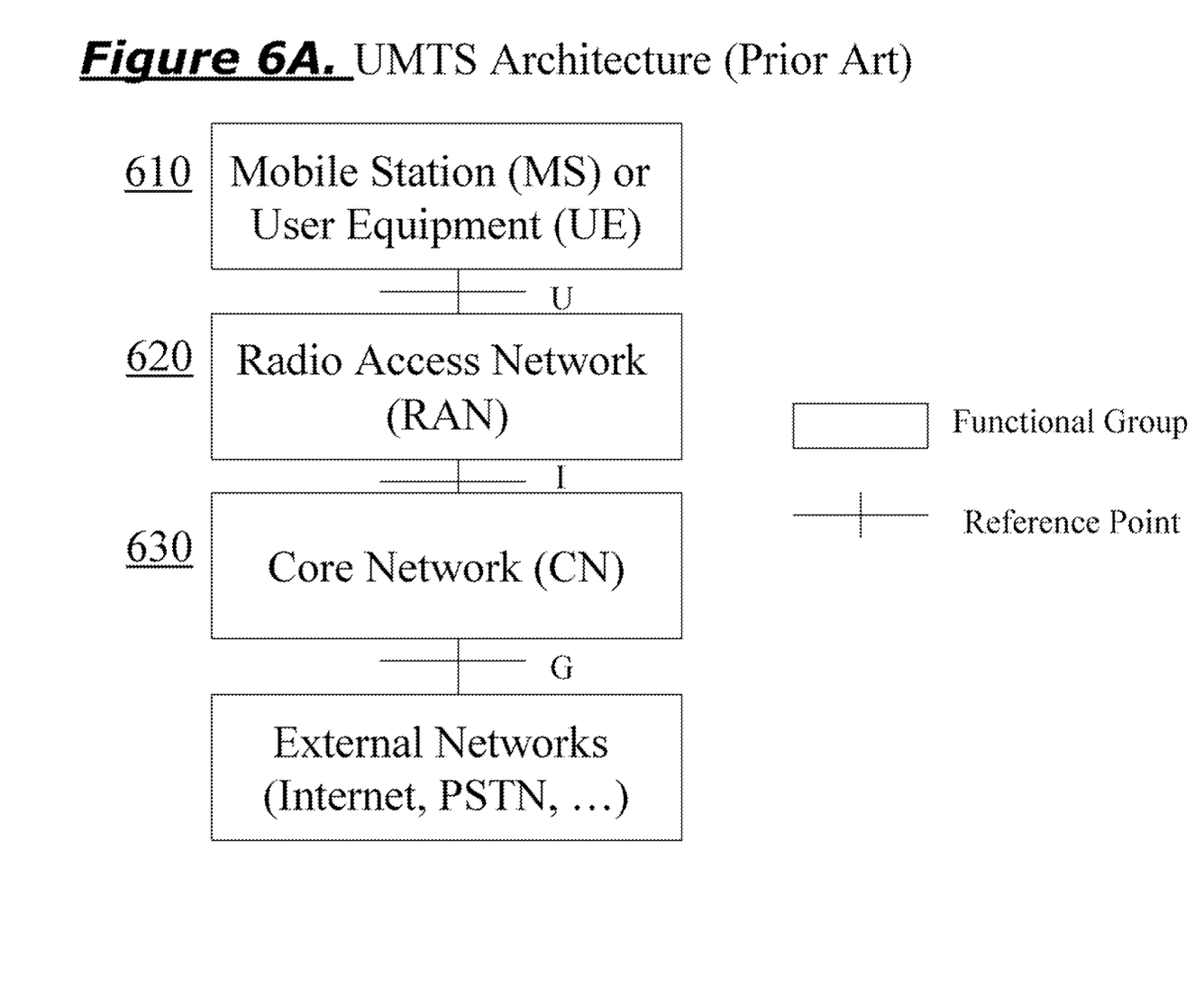
FIG. 6A shows a high level UMTS Architecture.

UMTS (Universal Mobile Telecommunications System) is adopted as an example to describe the disclosed inventions. UMTS is the 3G (third generation) mobile communications system employing WCDMA (Wideband Code Division Multiple Access) as the air interface technology. (UMTS is also called the WCDMA communications system.) UMTS architecture is similar to that of the 2G (second generation) mobile communications system. FIG. 6A gives a high-level view of the UMTS architecture. Users access the network through MS (Mobile Station) or UE (User Equipment) 610. Other UMTS components are RAN (Radio Access Network) 620 and CM (Core Network) 630. The RAN 620 implements functionality related to wireless radio and is also called UTRAN (Universal Terrestrial Radio Access Network), because UMTS employs UTRAN.

Figure 6B:
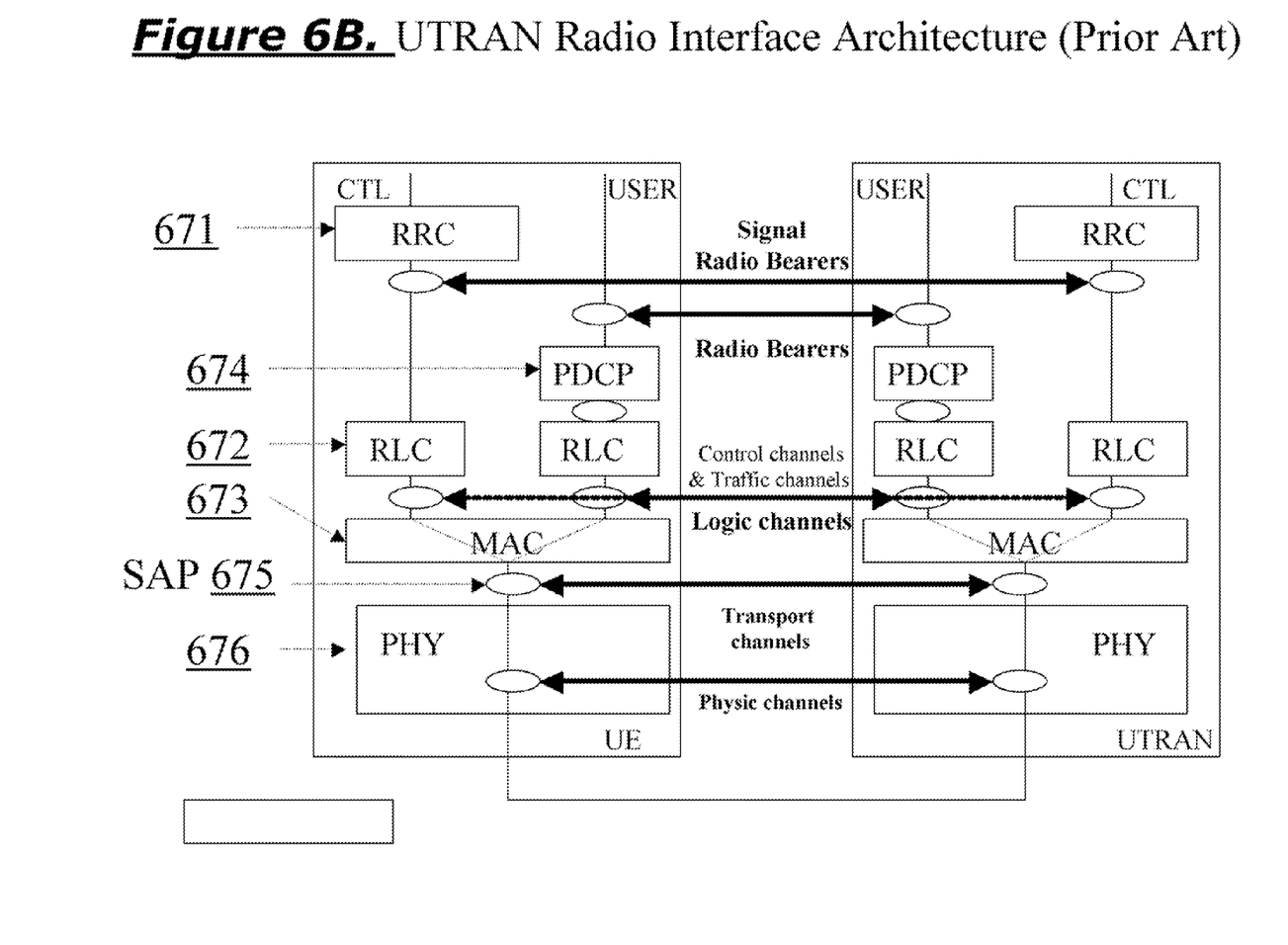
FIG. 6B shows a simplified UTRAN Radio Interface Architecture.

The UTRAN Radio Interface includes layer 1 (physical layer), layer 2 (data link layer), and layer 3 (network layer). FIG. 6B shows a simplified UTRAN Radio Interface Architecture. (Only sublayers pertinent to this application are discussed here.) Network layer includes RRC (Radio Resource Control) sublayer 671. It exists in the control plane only and is responsible for controlling the configuration, of UMTS radio interface Layers 1 and 2. Data Link layer includes RLC (Radio Link Control) sublayer 672, MAC (Medium Access Control) sublayer 673, and PDCP (Packet Data Convergence Protocol) sublayer 674, RLC sublayer 672 has 3 different peer entities. There is one transmitting and one receiving entity for the transparent mode service and the unacknowledged mode service; and one combined transmitting and receiving entity for the acknowledged mode service. The following functions are supported by RLC:

Segmentation and reassembly;
Concatenation;
Padding;
Transfer of user data;
Error correction;
In-sequence delivery of higher layer PDUs;
Duplicate detection;
Flow control;
Sequence number check;
Protocol error detection and recovery;
Ciphering; and
Suspend/resume function.

The protocol is transmitted as PDUs. They can be Data PDUs or Control PDUs.

The MAC layer 673 provides data transfer services on logical channels. A set of logical channel types is defined for different kinds of data transfer services as offered by MAC. Each logical channel type is defined by the type of information being transferred.

PDCP sublayer 674 uses the services provided by the Radio Link Control.

(RLC) sublayer 672. Network layer protocols are intended to be capable of operating over services derived from a wide variety of subnetworks and data links, UMTS supports several network layer protocols (IPv4 and IPv6) providing protocol transparency for the users of the service. Introduction of new network layer protocols to be transferred over UTRAN must be possible without any changes to UTRAN protocols. Therefore, all functions related to transfer of packets from higher layers (PDCP SDUs) are carried out in a transparent way by the UTRAN network entities. This is one of the requirements for UTRAN PDCP. It performs the following functions:

Header compression and decompression of IP data streams (e.g., TCP/IP and RTP/UDP/IP headers) at the transmitting and receiving entity, respectively. The header compression method is specific to the particular network layer, transport layer or upper layer protocol combinations e.g. TCP/IP and RTP/UDP/IP.

Transfer of user data. Transmission of user data means that PDCP receives PDCP SDU from the NAS and forwards it to the RLC layer and vice versa. Maintenance of PDCP sequence numbers for radio bearers that are configured to support lossless SRNS relocation.

Since the major function of PDCP is header compression and decompression of IP data streams at the transmitting and receiving entity, it is a natural place to implement IP packet analysis function. Consequently; today's User Equipment implements virus detection mechanism in PDCP sublayer by checking and analyzing protocol information and addressing information in contained IP packet. This is especially true for ACL based virus detection techniques.

Figure 7A:
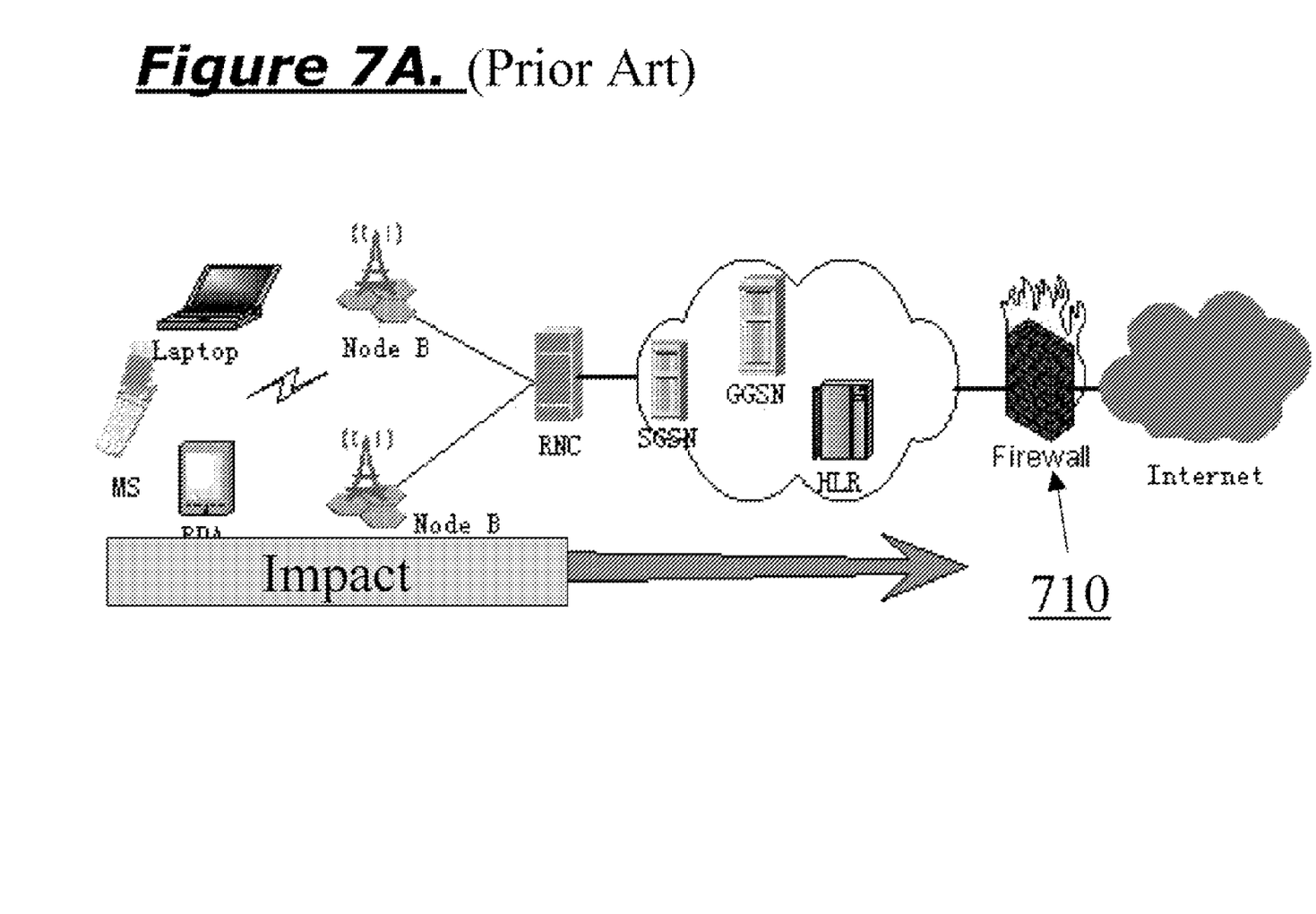
FIG. 7A shows virus infected flow in WCDMA access networks equipped with traditional fire walls.
Figure 7B:
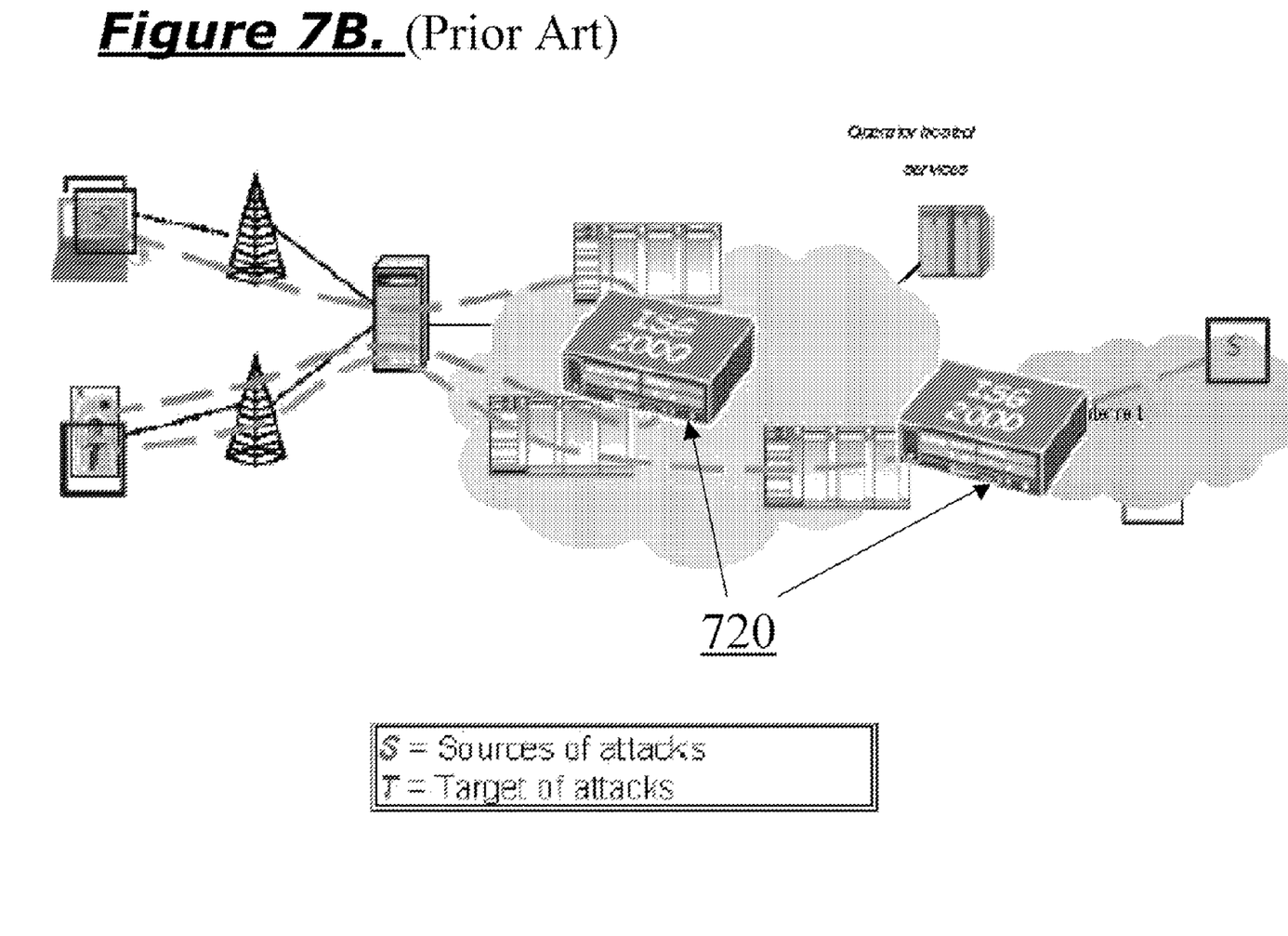
FIG. 7B shows one implementation of traditional firewalls.

FIG. 7A shows the impact of virus infected flow to an example WCDMA access network. Since firewalls 710 are normally installed between a mobile network and the Internet, the virus from Internet servers to the terminals is filtered out by the firewalls. However, the virus infected flow from the terminals will consume the most precious resources at the access networks before they are filtered out by the firewalls. FIG. 7B shows such an implementation wherein ISG2000 720 is anti-virus devices installed between access nodes and between an access node and the Internet.

Figure 8A:
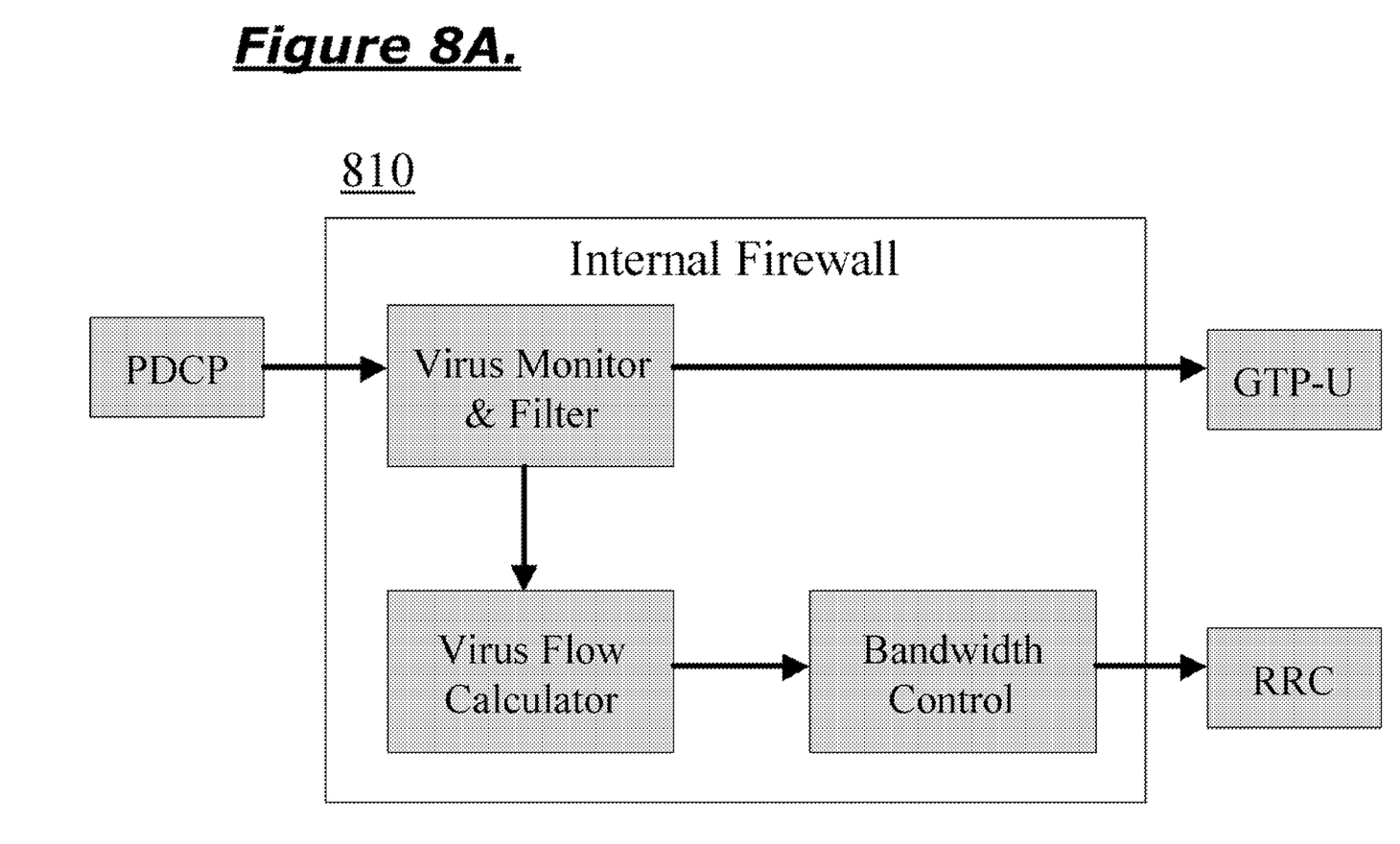
FIG. 8A shows internal firewall implementation.
Figure 8B:
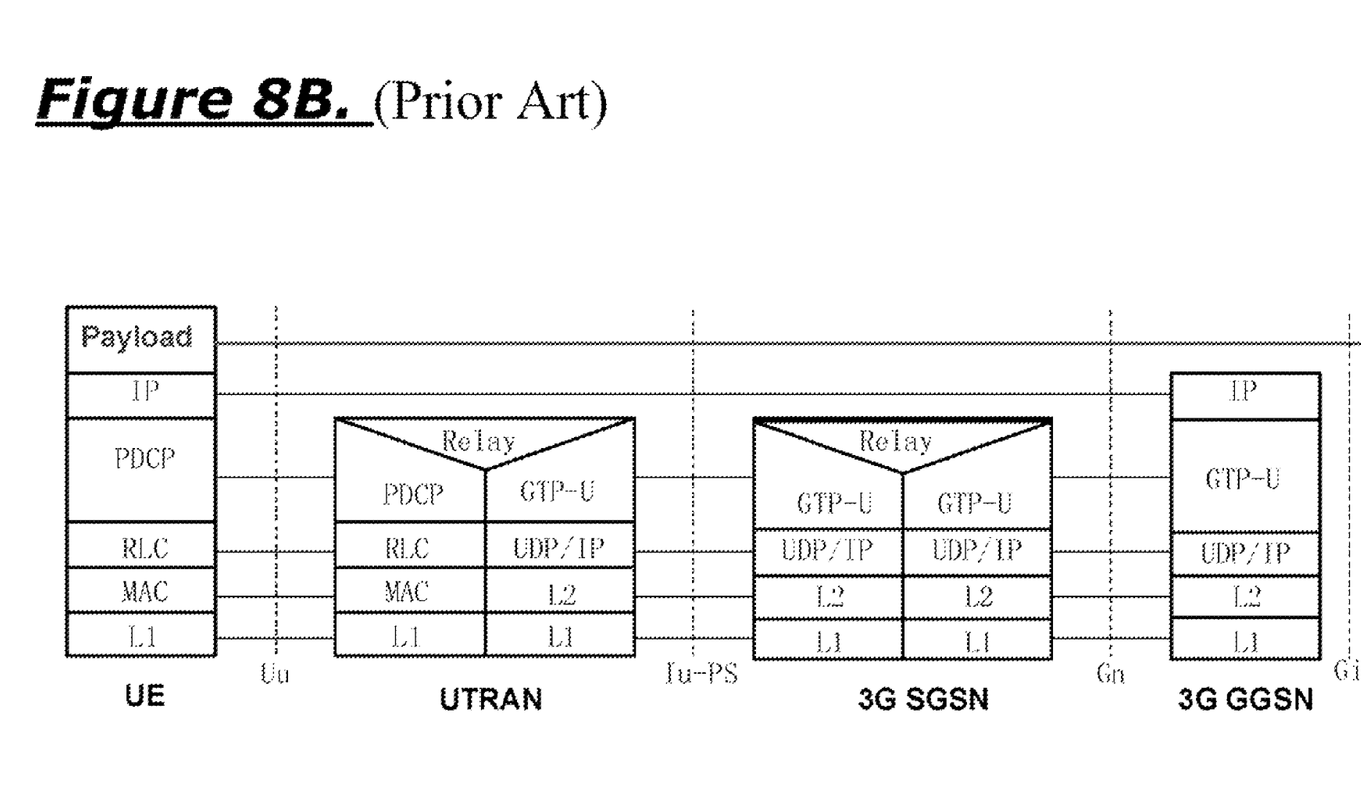
FIG. 8B shows protocol stacks between UE and GGSN.
Figure 8C:
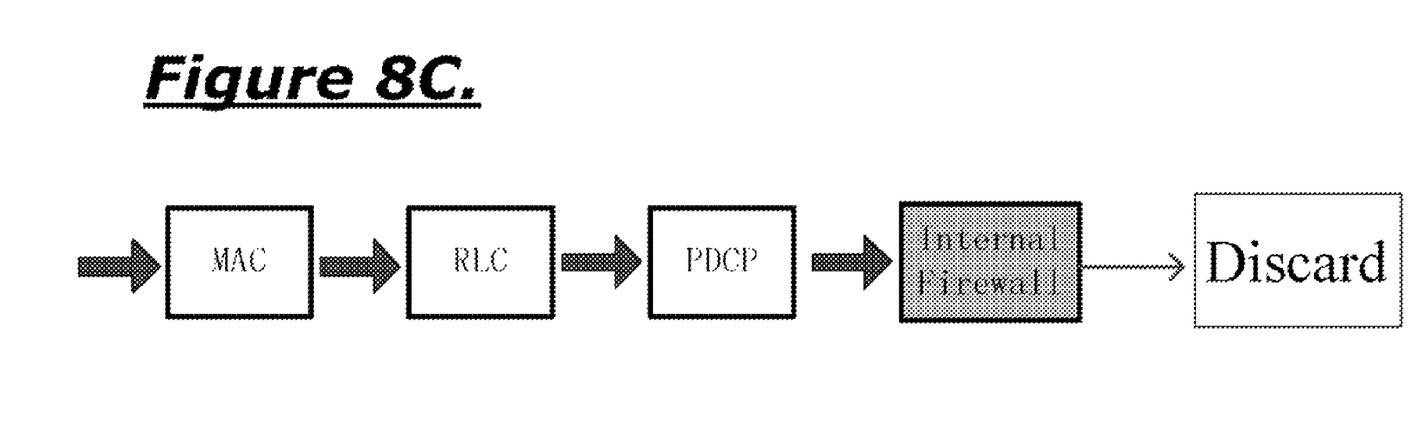
FIG. 8C shows internal firewall catches and discards PDCP payload containing virus-infected IP packet.
Figure 8D:
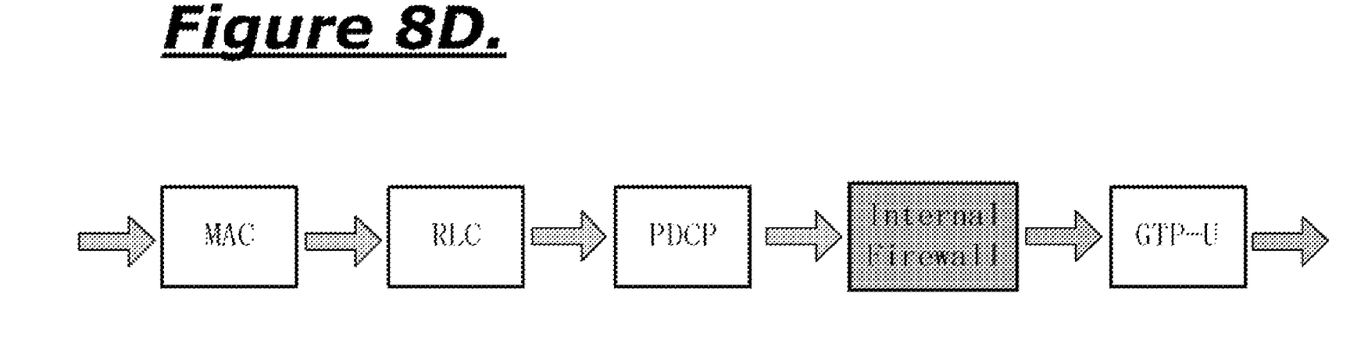
FIG. 8D shows internal firewall forwards normal PDCP payloads.
Figure 8E:
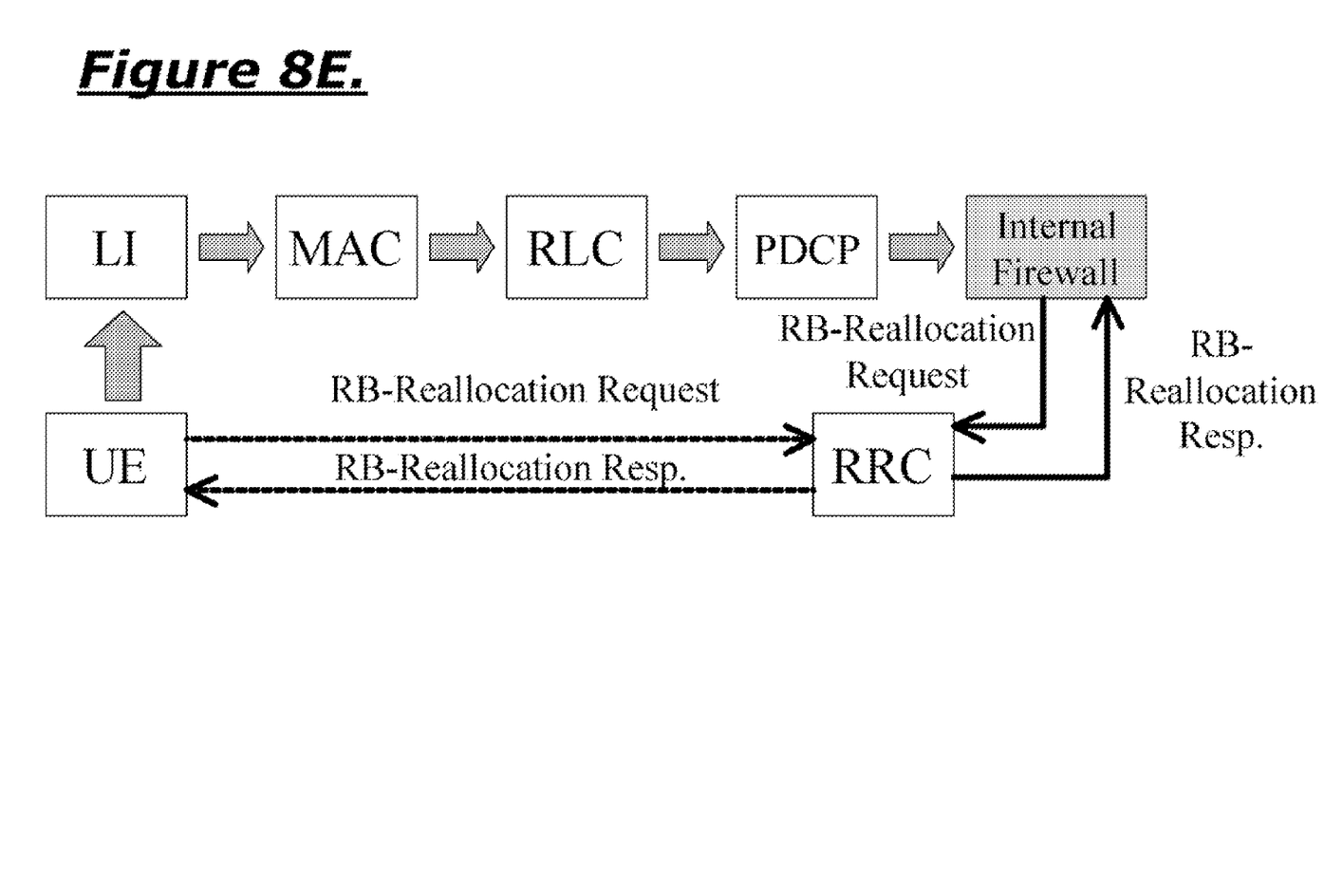
FIG. 8E shows an example internal firewall architecture.

FIG. 8A shows a new internal firewall implementation for the disclosed embodiments. An internal firewall 810 based on disclosed embodiments is added between PDCP and GTP-U entities. FIG. 8B shows the user protocol stack between UE and GGSN in WCDMA to illustrate the rationale of internal firewall implementation. The IP packets between UE and GGSN are PDCP protocol payloads, and are transparent to UTRAN. Generally UTRAN has no need to process PDCP payloads. In reality, virus infected data packets are potentially contained in those "payloads", transmitted via UTRAN to SGSN to GGSN. The transmission of virus-infected data packets unnecessarily consumed resources of the radio interface between UE and UTRAN, of Iub interface, of interface between UTRAN and SGSN, and of interface between SGSN and GGSN. On the other hand, the introduction of internal firewall between PDCP and GTP-U places the traditional firewall features into RNC to process PDCP payloads. Consequently, the infernal firewall will monitor the IP packets contained in the PDCP payloads. If discards the PDCP payloads that contain virus-infected IP packets (see FIG. 8C), and otherwise, forwards them to GTP-U (see FIG. 8D). FIG. 8E shows example architecture of such an internal firewall implementation.

According to various disclosed embodiments, there is provided: a method for managing an information flow, comprising the actions of: detecting malware-contamination intensities in multiple substreams of the flow; and adjusting bandwidth allocations for respective ones of said substreams based on said detected intensities.

According to various disclosed embodiments, there is provided: A method for managing bandwidths in wireless communications, comprising the actions of: a) when observed malware contamination in a respective channel exceeds a threshold value, then reducing that channel's bandwidth; and b) increasing said bandwidth in response to at least some reductions of observed malware contamination.

According to various disclosed embodiments, there is provided: A wireless communication system, comprising: channel management logic, which can reduce or increase bandwidth allocation for multiple wireless communication channels; and a contamination detector, which is configured to detect the malware contamination condition of at least one channel, and which requests said channel management logic to reduce or increase bandwidth allocation based on at least some changes in the detected contamination condition.

According to various disclosed embodiments, there is provided: systems and methods in which the traction of virus-infected information in wireless uplink flows is monitored, and the different fractions are used to adjust bandwidth assignments for different channels. Channels which contain a high fraction of malware contamination are thereby prevented from imposing an excess burden on total available bandwidth.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, instead of implementing the method at the PDCP sublayer or as internal firewall between PDCP and GTP-U, it can also be implemented at GTPU sublayer.

For another example, the sample embodiment reports intensity information to RRC, it is envisioned that the detailed intensity information is not required and instead only indication of positive or negative intensity change are reported.

In yet other embodiments, the timer T and threshold V values are user programmable to give service providers flexibility to adjust based on local changes. For instance, by setting V=0 the method will always report the intensity, while setting V>100 the method will never report the intensity. Adjusting T value will change the frequency of detection periods.

The intensity can also be defined in other ways. For instance, intensity can be the absolute value of count2 instead of a ratio of count2/count1, such that the intensity of malware attack is bigger when the value in count2 is larger. For another instance, it can be defined as the longest string of continuous malware attack in one period, and again, the longer the continuous string of attack the bigger the intensity.

The new bandwidth can also be defined in ways other than continuous function. For instance, the following example step function can be used for

WCDMA:

| Intensity | Bandwidth |
|---|---|
| <10% | 384 kbps |
| >=10% | 256 bps |
| >=20% | 144 kbps |
| >=30% | 128 kbps |
| >=40% | 64 kbps |
| >=50% | 32 kbps |
| >=60% | 16 kbps |
| >=70% | 8 kbps |

Or another example step function that might be used for GPRS:

| Intensity | Bandwidth |
|---|---|
| <30% | 64 kbps |
| >=30% | 28.8 bps |
| >=50% | 19.2 kbps |

For another example, while the above text refers specifically to virus detection, it should be noted that the term "virus" is intended to refer broadly to a wide variety of types of malware (malicious software).

Other kinds of malware, depending on the availability of automatic detection, can include Trojans, trapdoors, keystroke loggers, adware, spyware and many other types which have occurred or will occur.

For another example, many different procedures and/or software architectures can be used for automatic virus detection, and many specific choices of the virus or malware detection implementation can be combined with the bandwidth management teachings discussed above. To the extent that undesired bandwidth consumption from any kind of malware can be identified (e.g. by pattern matching and/or traffic analysis), the foregoing procedures and architectures can be applied advantageously.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112. The claims as filed are intended to be as comprehensive as possible, and NO subject matter is intentionally relinquished, dedicated, or abandoned.

What is claimed is:

1. A method for managing an information flow by a processor coupled to a memory, the method comprising:
    detecting, by the processor, malware contamination intensities in a plurality of substreams of the information flow; and
    adjusting bandwidth allocations for one or more respective substreams based on the detected malware contamination intensities,
    wherein the malware contamination intensities comprise a ratio of malware infected data packets to total data packets during a period.

2. The method of claim 1, wherein said adjusting action reduces the bandwidth allocation for a respective substream of the flow when observed malware contamination in that substream exceeds a threshold value.

3. A method for managing an information flow by a processor coupled to a memory, the method comprising:
    detecting, by the processor, malware contamination intensities in multiple substreams of the flow; and
    adjusting bandwidth allocations for respective ones of said substreams based on said detected intensities,
    wherein said adjusting action reduces the bandwidth allocation for a respective substream of the flow when observed malware contamination in that substream exceeds a first threshold value, and
    wherein said adjusting action increases the bandwidth allocation for a respective substream of the flow only when observed malware contamination in that substream falls below a second threshold value.

4. A method for managing an information flow by a processor coupled to a memory, the method comprising:
    detecting, by the processor, malware contamination intensities in multiple substreams of the flow; and
    adjusting bandwidth allocations for respective ones of said substreams based on said detected intensities,
    wherein said adjusting action reduces the bandwidth allocation for a respective substream of the flow when observed malware contamination in that substream exceeds a first threshold value, and
    wherein said adjusting action increases the bandwidth allocation for a respective substream of the flow only when observed malware contamination in that substream falls below a second threshold value, and a minimum delay has passed.

5. The method of claim 1, wherein said action of detecting malware-contamination intensities is implemented by a virus-detection procedure.

6. The method of claim 1, wherein said action of detecting malware-contamination intensities further comprises a filtering action applying on Packet Data Convergence Protocol (PDCP) packets to filter malware infected packets.

7. A method for managing bandwidths in wireless communication channels by a processor coupled to a memory, the method comprising:
    (a) observing, by the processor, a malware contamination intensity in a communication channel, wherein the malware contamination intensity comprises a ratio of malware infected data packets to total data packets during a period, then (b) reducing the communication channel's bandwidth when the malware contamination intensity exceeds a first threshold value; and (c) increasing said the communication channel's bandwidth when the malware contamination intensity falls below a second threshold value.

8. The method of claim 7, wherein said action (c) of increasing the communication channel's bandwidth is further conditioned on an earlier incidence of said action (b) within the period.

9. The method of claim 8 wherein said action (c) is further conditioned on a clock exceeding a minimum time delay,
wherein the malware contamination intensity exceeds the first threshold at a time T1,
wherein the malware contamination intensity falls below the second threshold at a time T2, and
wherein the clock represents the period of time between the time T1 and the time T2.

10. The method of claim 7, wherein observing the malware contamination intensity uses a malware detection procedure.

11. The method of claim 7, wherein the first threshold is greater than the second threshold.

12. The method of claim 7, wherein the said action (b) reduces the communication channel's bandwidth from an Existing Bandwidth value to a New Bandwidth value, and wherein the New Bandwidth value is calculated based on the virus contamination intensity.

13. The method of claim of claim 12, wherein the said action (c) increases the communication channel's bandwidth from the New Bandwidth value to the Existing Bandwidth value.

14. A method for managing uplink bandwidths in wireless uplink communications by a processor coupled to a memory, the method comprising:

(a) observing, by the processor, a virus contamination intensity in an uplink channel, wherein the virus contamination intensity comprises a ratio of virus infected data packets to total data packets during a period, then (b) reducing the uplink channel's bandwidth when the virus contamination intensity exceeds a first threshold value; and (c) increasing the uplink channel's bandwidth when the virus contamination intensity falls below a second threshold value.

15. The method of claim 14, wherein said action (c) of increasing the uplink channel's bandwidth is further conditioned on an earlier incidence of said action (b) within the period.

16. The method of claim 15, wherein said action (c) is further conditioned on a clock exceeding a minimum time delay,
wherein the virus contamination intensity exceeds the first threshold at a time T1,
wherein the virus contamination intensity falls below the second threshold at a time T2, and
wherein the clock represents the period of time between the time T1 and the time T2.

17. The method of claim 14, wherein observing the virus contamination intensity uses a virus detection procedure.

18. The method of claim 14, wherein the first threshold value is greater than the second threshold value.

19. The method of claim 14, wherein the said action (b) reduces the uplink channel's bandwidth from an Existing Bandwidth value to a New Bandwidth value, and wherein the New Bandwidth value is calculated based on the virus contamination intensity.

20. The method of claim of claim 19, wherein the said action (c) increases the uplink channel's bandwidth from the New Bandwidth value to the Existing Bandwidth value.

21. A wireless communication system, comprising:
a channel management logic configured to reduce or increase a bandwidth allocation for a plurality of wireless communication channels; and
a contamination intensity detector configured to detect a malware contamination condition in at least one of the wireless communication channels and request that the channel management logic reduce or increase the bandwidth allocation based on at least some changes in the detected malware contamination condition,
wherein the malware contamination condition comprises a ratio of malware infected data packets to total data packets during a period.

22. The system of claim 21, wherein the contamination intensity detector is configured to check a plurality of Packet Data Convergence Protocol (PDCP) packets for malware contamination.

23. The system of claim 21 further comprising:
a contamination filter configured to filter a plurality of malware-contaminated packets in at least one channel,
wherein the contamination filter is configured to check a plurality of Packet Data Convergence Protocol (PDCP) packets for malware contamination and drops the malware-contaminated PDCP packets.

* * * * *